(12) United States Patent
Xiong et al.

(10) Patent No.: US 8,427,074 B1
(45) Date of Patent: Apr. 23, 2013

(54) PLC CONTROLLER AND DISCHARGE LIGHTING BALLAST RECEIVER WITH HIGH NOISE IMMUNITY

(75) Inventors: Wei Xiong, Madison, AL (US); Danny Pugh, Harvest, AL (US); Christopher Radzinski, Huntsville, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 1084 days.

(21) Appl. No.: 12/398,494

(22) Filed: Mar. 5, 2009

Related U.S. Application Data (60) Provisional application No. 61/034,004, filed on Mar. 5, 2008.

(51) Int. Cl.
*G05F 1/00* (2006.01)

(52) U.S. Cl.
USPC ... 315/307; 315/291; 315/209 R; 315/DIG. 4; 340/13.23; 340/13.27; 340/870.24; 340/870.26

(58) Field of Classification Search .......... 315/291, 315/307, 247, 244, 224, 246, 209 R, 289, 315/290, 362, 360, DIG. 2, DIG. 4, DIG. 7; 340/870.3, 870.4, 870.39, 870.24, 870.26, 340/12.15, 12.32, 12.38, 13.23, 13.27; 375/259, 375/285, 238
See application file for complete search history.

(56) References Cited

U.S. PATENT DOCUMENTS

| | | | |
|---|---|---|---|
| 3,488,517 A | 1/1970 | Cowan et al. | |
| 3,525,078 A | 8/1970 | Baggott | |
| 3,594,584 A | 7/1971 | Woods | |
| 3,714,451 A | 1/1973 | Whitney et al. | |
| 3,721,830 A | 3/1973 | Oishi et al. | |
| 3,818,466 A | 6/1974 | Honda | |
| 4,254,403 A | 3/1981 | Perez-Cavero et al. | |
| 4,348,582 A | 9/1982 | Budek | |
| 4,400,688 A | 8/1983 | Johnston et al. | |
| 4,408,185 A | 10/1983 | Rasmussen | |
| 4,523,128 A | 6/1985 | Stamm et al. | |
| 4,704,563 A | 11/1987 | Hussey | |
| 5,068,576 A | 11/1991 | Hu et al. | |
| 5,227,762 A | 7/1993 | Guidette et al. | |
| 5,471,119 A | 11/1995 | Ranganath et al. | |
| 5,475,360 A | 12/1995 | Guidette et al. | |

(Continued)

*Primary Examiner* — Haiss Philogene
(74) *Attorney, Agent, or Firm* — Waddey & Patterson, P.C.; Mark J. Patterson (57) ABSTRACT

A power line communication system communicates a ballast dimming level to an electronic ballast over an AC power line. A power line controller is operable to generate the ballast control signal and to insert that signal on the AC power signal being transmitted over the AC power line. A power line receiver receives the AC power signal and extracts the ballast control signal from the AC power signal to generate the dimming level signal corresponding with the desired ballast dimming level. To insert the ballast control signal on the AC power signal, the power line controller has a transformer coupled to the signal pattern circuit. The secondary winding of this transformer is connected in series with the AC power line to insert the ballast control signal on the AC power signal. This AC power signal is then transmitted to the electronic ballast. To extract the ballast control signal out of the AC power signal, the power line receiver has a resonant circuit connected in series with the AC power line. The resonant circuit should be tuned to transmit the ballast control signal and to filter out the AC power signal. A dimming level sensing circuit then senses the signal pattern on the ballast control signal and generates a dimming level signal corresponding to the desired ballast dimming level.

45 Claims, 6 Drawing Sheets

U.S. PATENT DOCUMENTS

| | | | |
|---|---|---|---|
| 5,691,605 A * | 11/1997 | Xia et al. | 315/307 |
| 5,691,691 A | 11/1997 | Merwin et al. | |
| 6,218,787 B1 * | 4/2001 | Murcko et al. | 315/194 |
| 6,225,759 B1 | 5/2001 | Bogdan | |
| 6,388,399 B1 | 5/2002 | Eckel et al. | |
| 6,608,552 B1 * | 8/2003 | Fogel et al. | 340/12.32 |
| 6,734,784 B1 | 5/2004 | Lester | |
| 7,391,168 B1 * | 6/2008 | Dernovsek et al. | 315/291 |
| 7,619,539 B2 * | 11/2009 | Veskovic et al. | 340/4.3 |
| 7,843,145 B2 * | 11/2010 | McKenzie et al. | 315/291 |

* cited by examiner

PLC CONTROLLER AND DISCHARGE LIGHTING BALLAST RECEIVER WITH HIGH NOISE IMMUNITY

CROSS-REFERENCES TO RELATED APPLICATIONS

This application is a Non-Provisional Utility application which claims the benefit of U.S. Provisional Application Ser. No. 61/034,004 filed Mar. 5, 2008, entitled "A Novel Low Cost PLC Controller and Discharge Lighting Ballast Receiver with High Noise Immunity" which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to a power line communication system for transmitting a ballast dimming level to an electronic ballast.

More particularly, this invention pertains to a power line communication system that has improved noise immunity for transmitting the ballast dimming level to the electronic ballast.

Electronic ballasts are utilized to generate and control the amount of power consumed by gas discharge lamps. The ballast dimming level determines the power output of the electronic ballast and therefore the lighting intensity of the lamp. A ballast dimming level may be communicated to a power line receiver associated with the electronic ballast. The power line receiver receives a ballast control signal having dimming level information and generates a dimming level signal corresponding to the desired ballast dimming level. The dimming level signal then causes the electronic ballast to generate an AC lamp signal to the lamp in accordance with the desired dimming level. In this manner, a user can control the power consumed by the lamp.

Often, it is advantageous to communicate the lamp dimming level over the AC power signal that powers the electronic ballast. A power line controller may be utilized to insert information on the AC power signal to communicate the desired dimming level to the power line receiver. The power line controller generates the ballast control signal and inserts that ballast control signal on the AC power signal. The power line receiver then extracts this information from the AC power signal to generate the appropriate dimming level signal. Typically, the dimming level signal is transmitted to an inverter control circuit which controls the amount of power generated by the ballast to the lamp.

Several prior art solutions exist for transmitting information to the electronic ballast over AC power lines, including using power line modems, high frequency injection codes and line voltage modulation codes. Unfortunately, the equipment required to insert information into the AC power signal and then extract the information at the ballast is expensive. Furthermore, these systems are particularly sensitive to noise and require ballast control signals with high signal levels to communicate the desired ballast dimming level over the power line. This is particularly true if the system is communicating with several electronic ballasts at once.

What is needed, then, is a power line communication system that inserts information on the AC power signal that is more cost efficient and less sensitive to noise.

BRIEF SUMMARY OF THE INVENTION

The present invention pertains to a power line communication system that communicates a ballast dimming level to an electronic ballast over an AC power line. The system has a power line controller and a power line receiver connected to the AC power line. The power line controller is operable to generate the ballast control signal and to insert that signal on the AC power signal being transmitted over the AC power line. The power line receiver receives the AC power signal and extracts the ballast control signal from the AC power signal to generate the dimming level signal corresponding with the desired ballast dimming level. The power line receiver may be integral to the electronic ballast or may be a separate apparatus that communicates with the electronic ballast.

A power line controller in accordance with this invention has a signal pattern circuit for producing a ballast control signal corresponding to a predetermined communication code for communicating dimming levels to electronic ballasts. This communication code is simply a method of representing dimming levels for an electronic ballast so that the power line receiver can translate this information into the appropriate dimming level signal. The desired ballast dimming level being communicated by the power line controller is embedded in the ballast control signal as a signal pattern that is associated with the desired ballast dimming level.

To insert the ballast control signal on the AC power signal, the power line controller has a transformer coupled to the signal pattern circuit. The secondary winding of this transformer is connected in series with the AC power line to insert the ballast control signal on the AC power signal.

This AC power signal is then transmitted to the electronic ballast. To extract the ballast control signal out of the AC power signal, the power line receiver has a resonant circuit connected in series with the AC power line. The resonant circuit should be tuned to transmit the ballast control signal and to filter out the AC power signal. A dimming level sensing circuit then senses the signal pattern on the ballast control signal and generates a dimming level signal corresponding to the desired ballast dimming level.

DETAILED DESCRIPTION OF THE INVENTION

Figure 1:
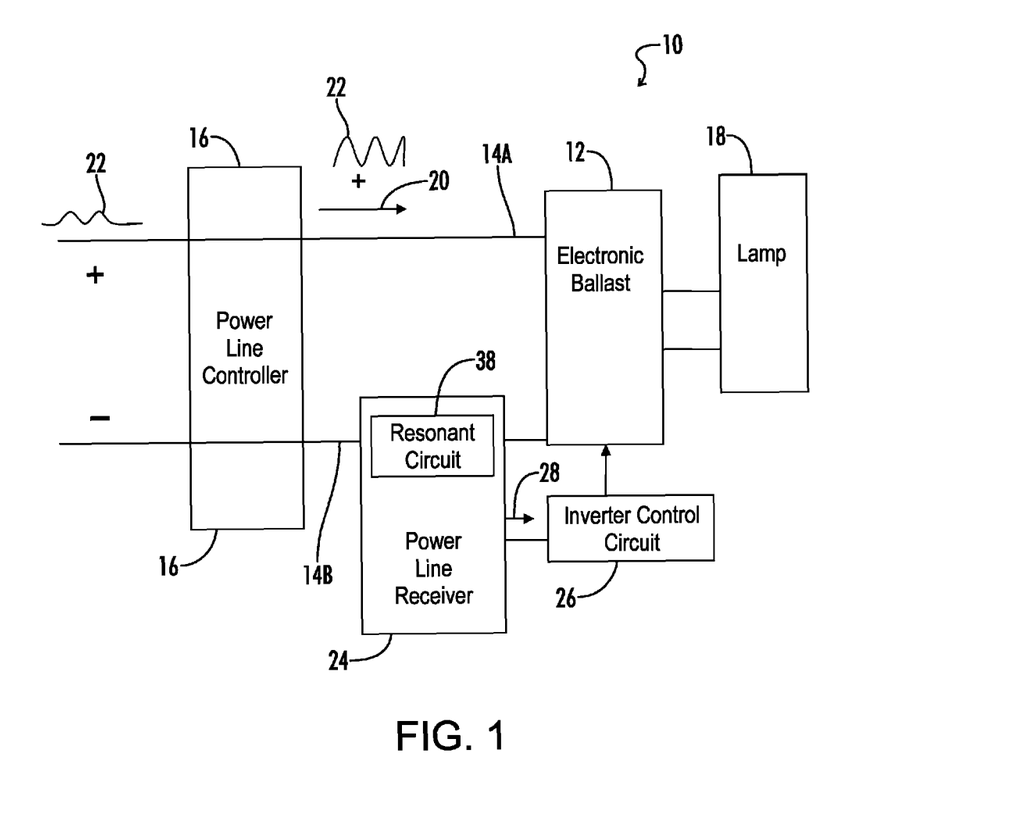
FIG. 1 is a block diagram of one embodiment of the power line communication system in accordance with this invention.

Referring now to FIG. 1, the power line communication system 10 communicates a desired ballast dimming level to one or more electronic ballasts 12 over AC power lines 14A, 14B. Power line controller 16 controls the electronic ballast 12 so that electronic ballast 12 dims a lamp 18 in accordance with a desired ballast dimming level.

To control the electronic ballast 12, the power line controller 16 inserts a ballast control signal 20 on an AC power signal 22 transmitted over the AC power lines 14A, 14B. Power line receiver 24 receives the AC power signal 22 and extracts the ballast control signal 20. Power line receiver 24 then generates a dimming level signal 28 corresponding to the desired ballast dimming level. This dimming level signal 28 may be received by an inverter control circuit 26 that controls the power output from the electronic ballast 12. An inverter control circuit 26 may then adjust the operating frequency of an inverter circuit so that the electronic ballast 12 operates at the desired ballast dimming level.

The power line communication system 10 may operate by utilizing analog and digital communication codes for communicating dimming levels to electronic ballasts. These codes generally associate a particular signal pattern with a particular ballast dimming level. For example, if a digital communication code is used, the signal pattern will represent a series of "ones" and "zeros". The power line receiver 24 may then translate the signal pattern into a digital word corresponding to a particular ballast dimming level to produce the appropriate dimming level signal 28.

Figure 1A:
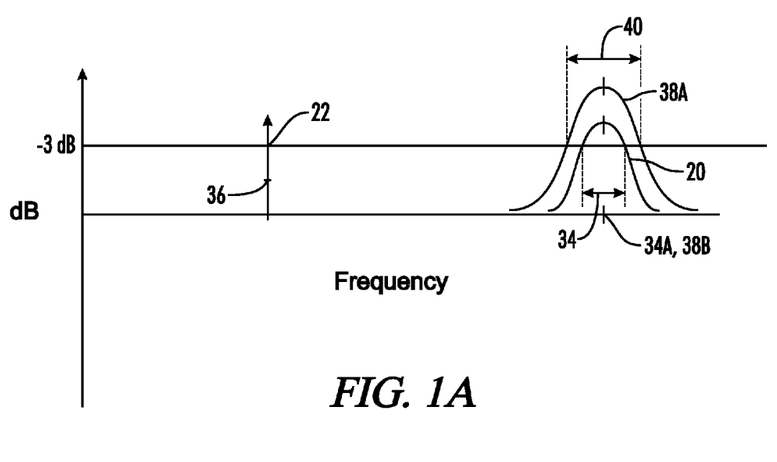
FIG. 1A is a frequency domain graph showing a frequency bandwidth of one embodiment of the ballast control signal, a frequency bandwidth of one embodiment of the AC power signal, and a bandwidth of transmission for one embodiment of the resonant circuit.

Referring now to FIGS. 1 and 1A, the ballast control signal 20 may be generated by the power line controller 16 to be within a particular frequency bandwidth 34. The frequency bandwidth 34 of the ballast control signal 20 should be outside a frequency bandwidth 36 of the AC power signal 22. Theoretically, the AC power signal 22 is represented as a Kronecker delta in the frequency domain and therefore has an infinitely thin frequency bandwidth 36. In practice however, the frequency bandwidth 36 of the AC power signal 22 actually does have a measurable bandwidth. FIG. 1A illustrates that the center frequency 34A of the ballast control signal 20 which is typically 15 kHz or higher. The power line receiver 24 may have a resonant circuit 38 with a response curve 38A that has a bandwidth 40 outside the bandwidth 36 of the AC power signal 22. The bandwidth 34 of the ballast control signal 20 however should be within the bandwidth 40 of the response curve 38A of the resonant circuit 38. This permits the power line receiver 24 to receive the ballast control signal 20 and to filter out the AC power signal 22.

Bandwidth is generally defined as a range of frequencies in which the frequency signal components of a signal or the response curve of the circuit are above an amplitude threshold. The standard amplitude threshold for defining bandwidth is typically half of the maximum value of the signal or −3 decibels. However, the meaning of bandwidth for this application is not limited to half the maximum value or −3 decibel threshold. The bandwidth of interest should correspond to the particular application of the invention. For example, if the ballast control signal 20 is particularly flat in the frequency domain so to include a significant amount of signal components away from a center frequency, the bandwidth 34 of the ballast control signal 20 may be defined by a higher amplitude threshold to compensate for signal components which may be above or near to the −3 decibel threshold. Conversely, if the ballast control signal is particularly narrow, it may be advantageous to lower the amplitude threshold that defines the bandwidth 34 of the ballast control signal 20 which would require a less sensitive resonant circuit 38.

Referring again to FIG. 1 and FIG. 1A, the resonant circuit 38 is connected in series with one of the AC power lines 14A, 14B. By connecting the resonant circuit 38 in series with one of the AC power lines 14A, 14B, the power line receiver 24 is able to detect ballast control signal 20 even if the ballast control signal 20 is very weak. The series connection of the resonant circuit 38 to one of the AC power lines 14A, 14B provides the power line receiver 24 with a detector with a high Q factor. This high Q factor allows the resonant circuit 38 to resonate with a high amplitude near the resonant frequency 38B. Consequently, the resonant circuit 38 may be configured to have a resonant frequency 38B as close as possible to the center frequency 34A of the ballast control signal 20. Theoretically, the resonant frequency 38B is chosen to be equal to the center frequency 34A of the ballast control signal 20. This series-connected resonant circuit 38 provides for high noise immunity and permits the signal level of the ballast control signal 20 to be relatively low.

Figure 2:
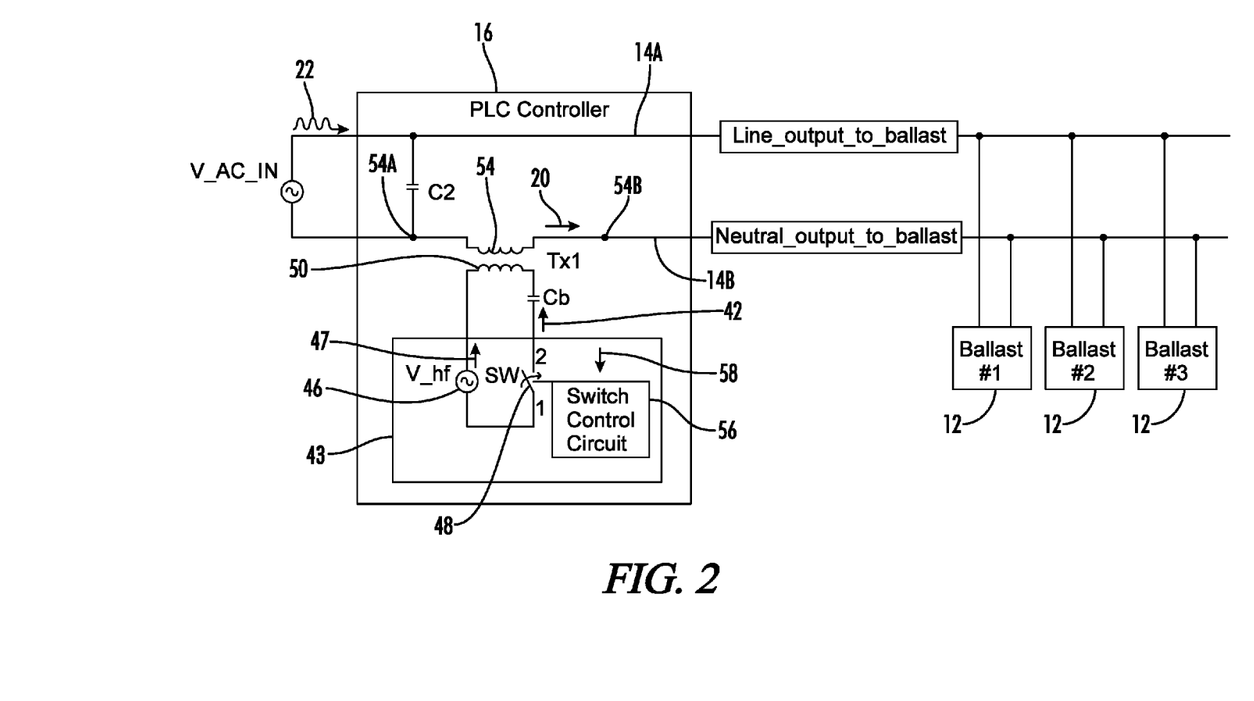
FIG. 2 is a circuit diagram of one embodiment of the power line controller of this invention.
Figure 3:
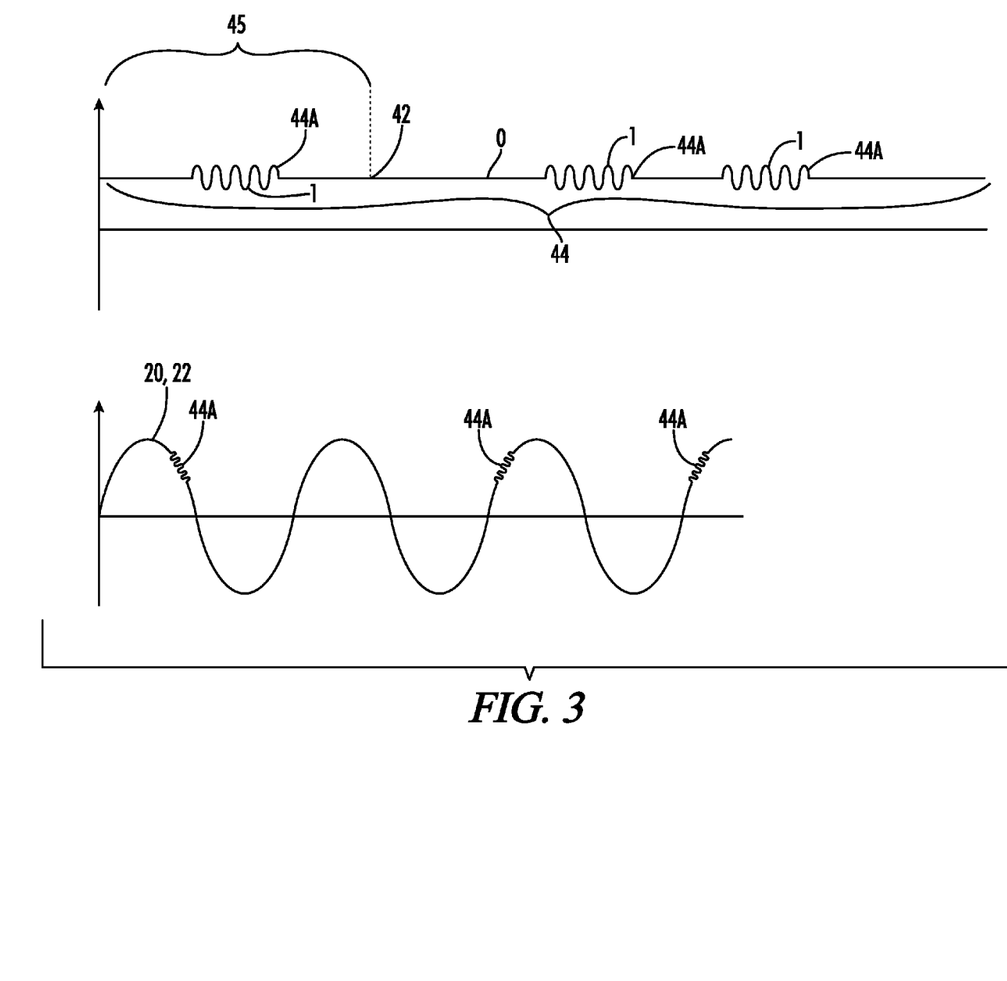
FIG. 3 is an illustration of two graphs related to signals created by the power line controller shown in FIG. 2. The top graph in FIG. 3 is a time domain illustration of the dimming level information signal generated by a switch pattern circuit of the power line controller. The bottom graph in FIG. 3 is a time domain illustration of an AC power signal for powering an electronic ballast after the power line controller has inserted a ballast control signal on the AC power signal.

Referring now to FIG. 2 and FIG. 3, the operation of one embodiment of the power line controller 16 is described. Power line controller 16 has a signal pattern circuit 43 that produces a dimming level information signal 42 with a signal pattern 44 that is utilized to communicate the desired ballast dimming level. As mentioned above, codes may be utilized to transmit information on the AC power signal 22. The signal pattern 44 of the dimming level information signal 42 may be generated in accordance with one of these codes.

For example, the embodiment of the power line controller 16 illustrated in FIG. 2 has a signal pattern circuit 43 that generates the dimming level information signal 42 in accordance with a digital high frequency injection scheme. The signal pattern 44 of the digital high frequency injection scheme is a series of high frequency pulses 44A that represent a series of bits. To illustrate, the presence of a high frequency pulse 44A during a particular time interval 45 of the dimming level information signal 42 may represent a "one" while the absence of a high frequency pulse 44A during a particular time interval may represent a "zero". This series of bits represents the desired ballast dimming level.

To generate the series of high frequency pulses 44A, the switch pattern circuit 43 has a high frequency signal production circuit 46 that generates a high frequency signal 47. The frequency of the high frequency signal 47 should be higher than the frequency of the AC power signal 22. In the illustrated embodiment, the AC power signal 22 operates at 50 Hz to 60 Hz while the frequency of the high frequency signal 47 is greater than 154 kHz.

A primary winding 50 of transformer TX_1 is coupled to the signal pattern circuit 43. Output terminals 54A, 54B of the power line controller 16 should be configured to connect the secondary winding 54 in series with AC power line 14B. High frequency pulses 44A are created by opening and closing the switch 48 which is coupled to the high frequency signal production circuit 46 and the transformer TX_1. Transformer, TX_1, may isolate switch pattern circuit 43 from the AC power signal 22 to protect the circuit. Switch 48 couples the high frequency signal 47 to the transformer TX_1 when the switch 48 is closed and suspends the transmission of the high frequency signal 47 to the transformer TX_1 when the switch 48 is open. By timing the opening and closing of switch 48, the signal pattern 44 of the dimming level information signal 42 represents the desired ballast dimming level through the series of high frequency pulses 44A.

The ballast control signal 20 is inserted on the AC power signal 22 and is associated with the dimming level information signal 42. The ballast control signal 20 may be the dimming level information signal 42. The power line receivers and AC power systems may be designed to be robust enough to receive and process a dimming ballast control signal 20 as simply the dimming level information signal 42 itself. However, dimming level information signal 42 may have characteristics that are disadvantageous for transmission over the AC power lines 14A, 14B. If so, certain components may be included so that the power line controller 16 inserts a suitable ballast control signal 20 on the AC power signal 22.

For example, a DC filter 54 may be coupled between the signal pattern circuit 43 and the transformer TX_1 to filter out DC signal components from the dimming level information signal 42. This prevents DC signal components from being transmitted over the AC power lines 14A, 14B. Transformer TX_1 may also affect the characteristics of the dimming level information signal 42, such as the voltage and current amplitudes of the ballast control signal 20. The power line controller 16 may also have additional equipment for manipulating the timing, frequency characteristics, or shape of the signal pattern 44 on the ballast control signal 20 in accordance with the particular characteristics required by the power line receiver. A high frequency filter C2 may be connected between the AC power lines 14A, 14B to prevent high frequency components in the ballast control signal 20 from being reflected on the AC power lines, 14A, 14B.

Secondary winding 54 of transformer TX_1 may connect in series with AC power line 14B to insert the ballast control signal 20 on the AC power signal 22. However, power line controller 16 may connect to either AC power line 14A, 14B to insert the ballast control signal 20 on the AC power signal 22. The series connection of secondary winding 24 allows the power line controller 16 to insert what may be a relatively weak ballast control signal 20 on AC power signal 22.

In the illustrated embodiment, switch control circuit 56 in the signal pattern circuit 43 opens and closes the switch 48 to generate the signal pattern 44. This switch control circuit 56 receives a dimming level input signal 58 to determine the desired ballast dimming ballast level which is to be communicated over the AC power lines 14A, 14B. Dimming level input signal 58 may be a digital signal that represents the desired dimming level or may be an analog signal such as a DC signal whose DC level represents the desired dimming level.

In either case, switch control circuit 56 translates this information into the appropriate signal pattern 44, for transmitting the desired ballast dimming level and opens and closes the switch 48 accordingly. Switch control circuit 56 may thus store or receive information about dimming level codes to produce the appropriate dimming level information signal 42. In addition, if the dimming level input signal 58 is a digital signal then the switch control circuit 56 may simply cause the switch 48 to open and close and create a signal pattern 44 of ones and zeros in accordance with the "ones" and "zeros" of the digital signal.

In contrast, if the power line receiver is not equipped to translate the digital format of the dimming level input signal 58, the switch control circuit 56 may translate the dimming level input signal into the appropriate digital format for the desired ballast dimming level and generate a signal pattern 44 in accordance with this format.

If the dimming level input signal 58 is an analog signal, then the switch control circuit 56 may associate the signal level of the dimming level input signal 58 with the desired ballasts dimming level and open and close the switch 48 accordingly. Once the ballast control signal 20 has been inserted on the AC power signal 22, the AC power signal 22 is transmitted over the AC power lines 14A, 14B to power one or more electronic ballasts 12. The illustrated embodiment generates a ballast control signal 20 having the series of high frequency pulses 44A in the dimming level information signal 42. The AC power signal 22 is shown in the bottom graph in FIG. 1A after having been inserted with ballast control signal 20. High frequency pulses 44A have been inserted on the AC power signal 22 for communication to a power line receiver.

Figure 4:
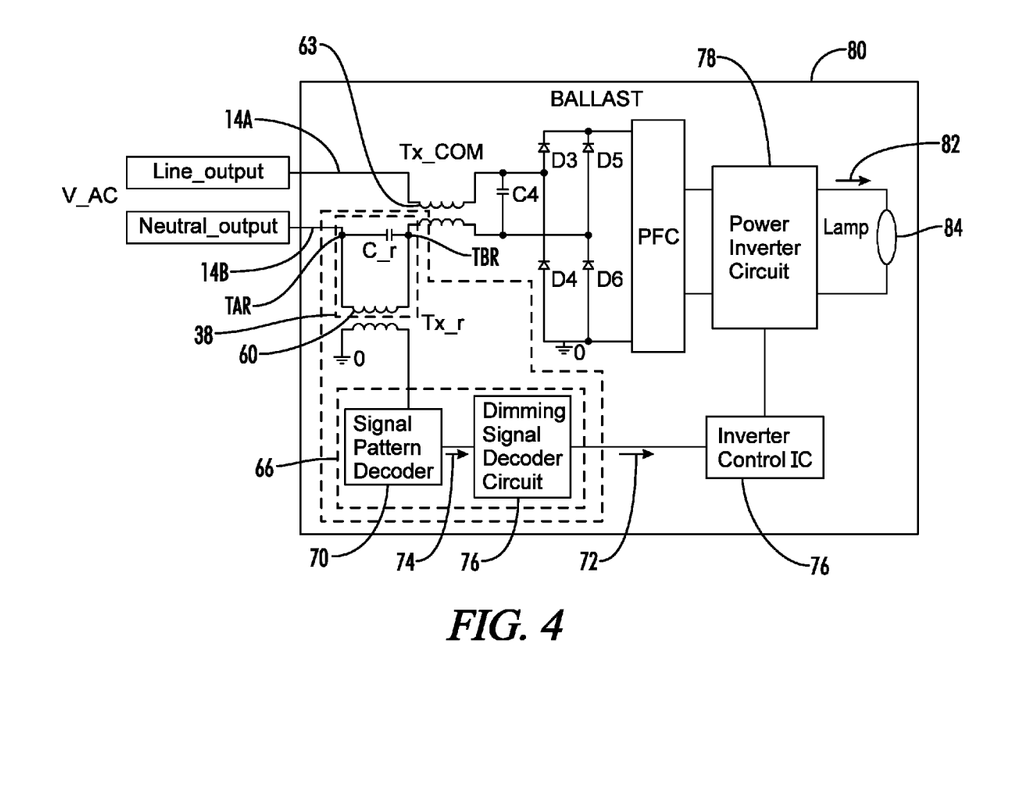
FIG. 4 is a circuit diagram of one embodiment of the power line receiver coupled to an electronic ballast.
Figure 4A:
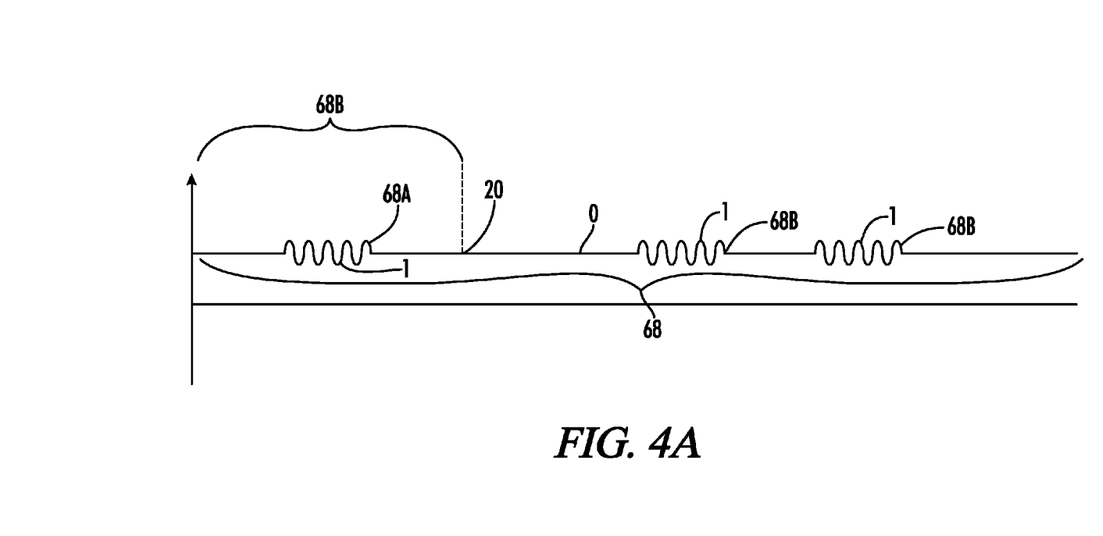
FIG. 4A is a time domain illustration of the ballast control signal after it has been extracted from the AC power signal by the power line receiver shown in FIG. 4.

Referring now to FIG. 1A, FIG. 4, and FIG. 4A, the operation of one embodiment of the power line receiver 24 that receives AC power signal 22 with ballast control signal 20 is shown and described. The power line receiver 24 shown in FIG. 4 is integrated into the electronic ballast 80. Input terminals TAR, TBR are configured so that when the power line receiver 24 is connected to AC power line 14B, resonant circuit 38 is connected in series with the AC power line 14B. Resonant circuit 38 of the power line receiver 24 is shown as a parallel resonant circuit having capacitor C_r and the primary winding 60 of transformer TX_r. This resonant circuit 38 should be connected to the AC power line 14B in front of the electromagnetic interference filter 63 in the electronic ballast 80 to avoid distortion of the ballast control signal 20. Transformer TX_r thus acts to isolate the power line receiver 24 from the power line 14B and also is part of a resonant circuit 38 for receiving the ballast control signal 20.

As explained above, the resonant circuit 38 may have a bandwidth 40 for transmitting the ballast control signal 20 and filtering out the AC power signal 22. Consequently, components C_r and primary winding 60 of the resonant circuit 38 are tuned to give resonant circuit 38 the appropriate bandwidth 40 for receiving this ballast control signal 20. In this manner, resonant circuit 38 extracts the ballast control signal 20 from the AC power signal 22 and transmits the ballast control signal 20 to secondary winding 64 of transformer TX_r which is connected to a dimming level sensing circuit 66. As illustrated in FIG. 2, the bandwidth 34 of the ballast control signal 20 is within the bandwidth 40 for the response curve 38A of the resonant circuit 38.

The dimming level sensing circuit 66 senses the signal pattern 68 on the ballast control signal 20 and generates a dimming level signal 72 corresponding to the desired ballast dimming level. In the illustrated embodiment, signal pattern 68 is formatted according to a high frequency digital communication code. Each "one" or "zero" is represented by the presence or absence of a high frequency pulse 68A during a time interval 68B of the ballast control signal 20. Dimming level sensing circuit 66 receives the ballast control signal 20 at signal pattern decoder circuit 70 which is operable to convert the signal pattern 68 into a digital signal 74 representing the desired ballast dimming level. Signal pattern decoder circuit 70 is thus equipped with an analog-to-digital converter capable of sensing a high frequency pulse 68A and creating a digital signal 74 in accordance with the transmitted signal pattern 68 of the ballast control signal 20. Dimming signal production circuit 76 receives digital signal 74 and is operable to generate the dimming level signal 72 corresponding to the desired ballast dimming level based on the digital signal 74.

Dimming level signal 72 may then be transmitted to an inverter control circuit 76 that controls the switch frequency of an inverter 78 of the electronic ballast 80. In this embodiment, dimming level signal 72 is a DC signal having a signal level corresponding to the desired ballast dimming level. Inverter control circuit 76 utilizes the dimming level signal 72 as a reference signal and compares the reference signal with a signal from the inverter 78 or lamp. Switch frequency of the inverter 78 is adjusted to produce an AC lamp signal 82 in accordance with this comparison. The power consumed by lamp 84 is thus adjusted in accordance with the dimming level signal 72. Dimming signal production circuit 76 may thus be configured with an digital to analog converter that receives the digital signal 74 and converts that digital signal 74 into the dimming level signal 72.

Thus, although there have been described particular embodiments of the present invention of a new and useful A LOW COST PLC CONTROLLER AND DISCHARGE LIGHTING BALLAST RECEIVER WITH HIGH NOISE IMMUNITY, it is not intended that such references be construed as limitations upon the scope of this invention except as set forth in the following claims.

What is claimed is:

1. A power line controller for controlling a ballast dimming level of an electronic ballast connected to receive an AC power signal from an AC power line, comprising:
    a signal pattern circuit operable to produce a dimming level information signal having a signal pattern associated with a desired ballast dimming level;
    a transformer coupled to the signal pattern circuit, the transformer having a transformer coil;
    first and second output terminals configured to connect the transformer coil in series with the AC power line so that a ballast control signal associated with the dimming level information signal is inserted on the AC power signal; and
    wherein the signal pattern circuit further comprises
        a high frequency signal production circuit that generates a high frequency signal, and
        a switch coupled between the high frequency signal production circuit and the transformer so that the switch transmits the high frequency signal to the transformer when the switch is closed and suspends the transmission of the high frequency signal to the transformer when the switch is open whereby the signal pattern of the dimming level information signal comprises a series of high frequency pulses associated with the desired ballast dimming level.

2. The power line controller of claim 1, wherein the ballast control signal has a frequency bandwidth different than a frequency bandwidth of the AC power signal.

3. The power line controller of claim 1, wherein the signal pattern circuit is operable to produce the dimming level information signal with a frequency bandwidth different than a frequency bandwidth of the AC power signal.

4. The power line controller of claim 1, wherein the signal pattern is associated with a dimming level communication code.

5. The power line controller of claim 1, wherein the signal pattern of the dimming level information signal comprises a series of high frequency pulses.

6. The power line controller of claim 1, wherein the signal pattern represents a digital code for communicating the desired ballast dimming level to the electronic ballast.

7. The power line controller of claim 1, further comprising a DC filter coupled between the signal pattern circuit and the transformer, the DC filter being operable to filter out DC signal components from the dimming level information signal.

8. The power line controller of claim 1, further comprising a high frequency filter connectable with the AC power line to block the reflection of high frequency signal components from the ballast control signal.

9. The power line controller of claim 1, further comprising the transformer having a second transformer coil coupled between the first transformer coil and the signal pattern circuit.

10. The power line controller of claim 1, wherein the high frequency signal has a frequency greater than a frequency of the AC power signal.

11. The power line controller of the claim 1, wherein the signal pattern circuit further comprises a switch control circuit coupled to the switch and having an input terminal for receiving a dimming level input signal related to the desired ballast dimming level, the switch control circuit being responsive to the dimming level input signal to open and close the switch so that the signal pattern circuit creates the series of high frequency pulses.

12. The power line controller of claim 11, wherein the switch control circuit being operable to open and close the switch so that the signal pattern of the dimming level information signal represents the desired ballast dimming level in accordance with a dimming level communication code.

13. A method of controlling a ballast dimming level of an electronic ballast connected to receive an AC power signal from an AC power line, comprising:
    generating a dimming level information signal having a signal pattern associated with a desired ballast dimming level; and
    utilizing a transformer with a transformer coil connected in series with the AC power line to insert a ballast control signal on the AC power signal, the ballast control signal being associated with the dimming level information signal; and
    wherein the step of generating the dimming level information signal further comprises
    generating a high frequency signal, and
    creating the signal pattern on the dimming level information signal by transmitting the high frequency signal to the transformer and blocking the transmission of the high frequency signal to the transformer whereby the signal pattern of the dimming level information signal comprises a series of high frequency pulses.

14. The method of claim 13, wherein the transformer has a second transformer coil coupled between the first transformer coil and the signal pattern circuit.

15. The method of claim 13, wherein generating the dimming level information signal further comprises creating the signal pattern so that the dimming level information signal is within a frequency bandwidth different than a frequency bandwidth of the AC power signal.

16. The method of claim 13, wherein the ballast control signal is within a frequency bandwidth different than a frequency bandwidth of the AC power signal.

17. The method of claim 13, wherein generating the dimming level information signal further comprises creating the signal pattern of the dimming level information signal in accordance with a dimming level communication code.

18. The method of claim 13, wherein the step of generating the dimming level information signal further comprises creating the signal pattern so that the signal pattern of the dimming level information signal represents the desired ballast dimming level in accordance with a digital code for communicating the desired ballast dimming level to the electronic ballast.

19. The method of claim 13, wherein the high frequency signal has a frequency greater than a frequency of the AC power signal.

20. The method of claim 13, further comprising filtering DC signal components out of the dimming level information signal.

21. The method of claim 13, further comprising blocking the reflection of high frequency signal components from the ballast control signal on the AC power line.

22. A power line receiver for determining a ballast dimming level of an electronic ballast connected to receive an AC power signal from an AC power line, comprising:
   a resonant circuit, the resonant circuit being operable to detect the ballast control signal transmitted on the AC power signal, the ballast control signal having a signal pattern associated with a desired ballast dimming level;
   first and second input terminals configured to connect the resonant circuit in series with the AC power line; and
   a dimming level sensing circuit coupled to the resonant circuit, the dimming level sensing circuit being functional to sense the signal pattern of the ballast control signal and generate a dimming level signal corresponding to the desired ballast dimming level.

23. The power line receiver of claim 22, wherein the dimming level sensing circuit further comprises a signal pattern decoder circuit operable to convert the signal pattern into a digital signal representing the desired ballast dimming level.

24. The power line receiver of claim 23, wherein the dimming level sensing circuit further comprises a dimming signal production circuit coupled to the signal pattern decoder circuit, the dimming signal production circuit being operable to generate the dimming level signal corresponding to the desired ballast dimming level based on the digital signal.

25. The power line receiver of claim 22, wherein the resonant circuit has a response curve with a bandwidth outside a frequency bandwidth of the AC power signal.

26. The power line receiver of claim 25, wherein the ballast control signal has a frequency bandwidth within the bandwidth of frequencies transmitted by the resonant circuit.

27. The power line receiver of claim 22, further comprising:
   a transformer having a primary winding for receiving the ballast control signal; and
   the resonant circuit including the primary winding of the transformer.

28. The power line receiver of claim 27, wherein the transformer further comprises a secondary winding coupled between the primary winding and the dimming level sensing circuit.

29. The power line receiver of claim 27, wherein the resonant circuit includes a capacitor in parallel with the primary winding of the transformer.

30. The power line receiver of claim 22, wherein:
   the signal pattern of the ballast control signal comprises a series of high frequency pulses; and
   the resonant circuit is tuned to detect the high frequency pulses.

31. A method of determining a ballast dimming level of an electronic ballast, comprising:
   receiving an AC power signal that includes a ballast control signal from an AC power line, the ballast control signal having a signal pattern associated with a desired ballast dimming level;
   utilizing a resonant circuit connected in series with the AC power line to detect the ballast control signal;
   sensing the signal pattern of the ballast control signal; and
   generating a dimming level signal corresponding to the desired ballast dimming level.

32. The method of claim 31, wherein generating the dimming level signal corresponding to the desired ballast dimming level further comprises converting the signal pattern into a digital signal representing the desired ballast dimming level.

33. The method of claim 32, wherein generating the dimming level signal corresponding to the desired ballast dimming level further comprises utilizing the digital signal to produce a dimming level signal corresponding to the desired ballast dimming level.

34. The method of claim 31, wherein the resonant circuit has a response curve with a bandwidth outside a frequency bandwidth of the AC power signal.

35. The method of claim 34, wherein the ballast control signal has a frequency bandwidth within the bandwidth of frequencies transmitted by the resonant circuit.

36. The method of claim 31, wherein the resonant circuit includes a transformer winding on a transformer.

37. The method of claim 31, wherein the resonant circuit includes a capacitor in parallel with the transformer winding.

38. The method of claim 31, wherein utilizing the resonant circuit connected in series with the AC power line to detect the ballast control signal further comprises, filtering a series of high frequency pulses that define the signal pattern of the dimming control signal out of the AC power signal.

39. A power line communication system for communicating a ballast dimming level to an electronic ballast, the power line communication system comprising:
   an AC power line for transmitting an AC power signal to the electronic ballast;
   a power line controller operable to generate a ballast control signal having a signal pattern associated with a desired ballast dimming level and being coupled to the AC power line to insert the ballast control signal on the AC power signal;
   a power line receiver that receives the AC power signal with the ballast control signal, including:
      a resonant circuit operable to extract the ballast control signal from the AC power signal, the resonant circuit being connected in series with the AC power line; and
      a dimming level sensing circuit coupled to the resonant circuit, the dimming level sensing circuit being functional to sense the signal pattern of the ballast control signal and generate a dimming level signal corresponding to the desired ballast dimming level.

40. The power line communication system of claim 39, wherein the power line controller further comprises a transformer having a secondary winding connected in series with the AC power line.

41. The power line communication system of claim 40, further comprising:
   the transformer having a primary winding; and
   a signal pattern circuit coupled to the primary winding, the signal pattern circuit operable to produce a dimming level information signal associated with the ballast control signal in accordance with a communication protocol.

42. The power line communication system of claim 39, wherein the resonant circuit has a response curve with a bandwidth outside a frequency bandwidth of the AC power signal.

43. The power line communication system of claim 42, wherein the ballast control signal has a frequency bandwidth within the bandwidth of frequencies transmitted by the resonant circuit.

44. The power line communication system of claim 39, further comprising:
- an electromagnetic interference filter for the electronic ballast coupled to the AC power line; and
- the resonant circuit being connected on the AC power line between the power line controller and the electromagnetic interference filter.

45. A method of communicating a ballast dimming level to an electronic ballast, comprising:
- generating a ballast control signal having a signal pattern associated with a desired ballast dimming level;
- inserting the ballast control signal on a AC power signal transmitted on an AC power line;
- receiving the AC power signal with the ballast control signal;
- extracting the ballast control signal from the AC power signal utilizing a resonant circuit connected in series with the AC power line;
- sensing the signal pattern of the ballast control signal; and
- generating a dimming level signal corresponding to the desired ballast dimming level.

\* \* \* \* \*